United States Patent
Park et al.

(10) Patent No.: US 7,099,685 B2
(45) Date of Patent: Aug. 29, 2006

(54) APPARATUS AND METHOD FOR PROVIDING MULTIMEDIA SERVICE IN A MOBILE TERMINAL

(75) Inventors: Young-Sik Park, Daegu-kwangyeokshi (KR); Jeon Man Park, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 1149 days.

(21) Appl. No.: 09/838,363

(22) Filed: Apr. 19, 2001

(65) Prior Publication Data

US 2001/0037393 A1   Nov. 1, 2001

(30) Foreign Application Priority Data

Apr. 26, 2000 (KR) ............... 2000-22107

(51) Int. Cl.
*H04B 1/38* (2006.01)

(52) U.S. Cl. .................. 455/550.1; 455/183.2

(58) Field of Classification Search ........... 455/306, 455/73, 550.1, 183.2, 566, 186.1; 709/219, 709/229, 203; 370/342; 348/14.07, 14.02, 348/14.03
See application file for complete search history.

(56) References Cited

U.S. PATENT DOCUMENTS

| 5,799,091 | A | | 8/1998 | Lodenius | |
| 5,948,066 | A | * | 9/1999 | Whalen et al. | ............. 709/229 |
| 6,498,788 | B1 | * | 12/2002 | Emilsson et al. | ........... 370/342 |
| 2002/0059481 | A1 | * | 5/2002 | Nunally | ......................... 710/5 |
| 2003/0191816 | A1 | * | 10/2003 | Landress et al. | ............ 709/219 |

FOREIGN PATENT DOCUMENTS

| DE | 198 29 855 | 7/1998 |
| EP | 0 797 342 | 9/1997 |
| WO | WO 99/59312 | 11/1999 |

OTHER PUBLICATIONS

Kuroda et al., "Multimedia Processors", Proceedings of the IEEE, vol. 86, No. 6, Jun. 1998, pp. 1203-1221.

* cited by examiner

*Primary Examiner*—Edward F. Urban
*Assistant Examiner*—Tu X. Nguyen
(74) *Attorney, Agent, or Firm*—Dilworth & Barrese LLP

(57) ABSTRACT

An apparatus provides a multimedia service in a mobile terminal. A main controller controls a call setup operation between the mobile terminal and a base station. A codec codes an audio signal output from a microphone and decodes a received audio signal. A display outputs image data, and a display driver drives the display. An image processor buffers information received from the main controller and a multimedia service processor, converts the buffered information according to an output mode of the display and provides the converted information to the display driver. The multimedia service processor performs, at a multimedia service request, accesses the corresponding server and sends a data request to the server, outputs received image data through the image processor, outputs received menu and character information data to the main controller, and outputs received audio data through the codec.

10 Claims, 3 Drawing Sheets

APPARATUS AND METHOD FOR PROVIDING MULTIMEDIA SERVICE IN A MOBILE TERMINAL

This application claims priority to an application entitled "Apparatus and Method for Providing Multimedia Service in a Mobile Terminal" filed in the Korean Industrial Property Office on Apr. 26, 2000 and assigned Ser. No. 2000-22107, the contents of which are hereby incorporated by reference.

BACKGROUND OF THE INVENTION

1. Field of the Invention

The present invention relates generally to a mobile terminal, and in particular, to an apparatus and method for providing a real-time audio and video service (or multimedia service) in a mobile terminal.

2. Description of the Related Art

In recent years, some improved mobile terminals have been developed having a short message service (SMS), such as for example, stock market information services and sports information services. This short message service, however, is available only with short characters, and cannot support moving images and audio information such as from a VOD (Video-On-Demand) system. That is, the existing short message service enables the mobile terminal to access a specific web site which provides only character information and still images as its contents. Thus, the prior art mobile terminals cannot function as a web phone.

SUMMARY OF THE INVENTION

It is, therefore, an object of the present invention to provide an apparatus and method for providing a real-time audio and video service (or multimedia service) in a mobile terminal.

It is another object of the present invention to provide an apparatus and method for reducing a load of a mobile terminal controller while providing a real-time audio and video service through the mobile terminal.

To achieve the above and other objects, there is provided a method for providing a multimedia service in a mobile terminal including a main controller for controlling a call setup operation between the mobile terminal and a base station; a codec for coding an audio signal output from a microphone and decoding a received audio signal; a display for outputting image data; a display driver for driving the display; an image processor for buffering information received from the main controller and a multimedia service processor, converting the buffered information according to an output mode of the display and providing the converted information to the display driver; and said multimedia service processor for performing, at a multimedia service request, an operation to provide access to the corresponding server and sending a data request to the server, outputting received image data through the image processor, outputting received menu and character information data to the main controller, and outputting received audio data through the codec. In the method, the multimedia service processor connects a call through the main controller and accesses the corresponding server, upon receipt of the multimedia service request. After completing the access, the multimedia service processor sends a multimedia information request to the server and sends a receive request to the main controller according to the information request. Upon receipt of the requested information, the main controller sends the corresponding information to the multimedia service processor. The multimedia service processor then analyzes the information to provide the information to the main controller if the information is character or menu information, to output the information through the image processor if the information is image data, and to output the information through the codec if the information is audio data.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
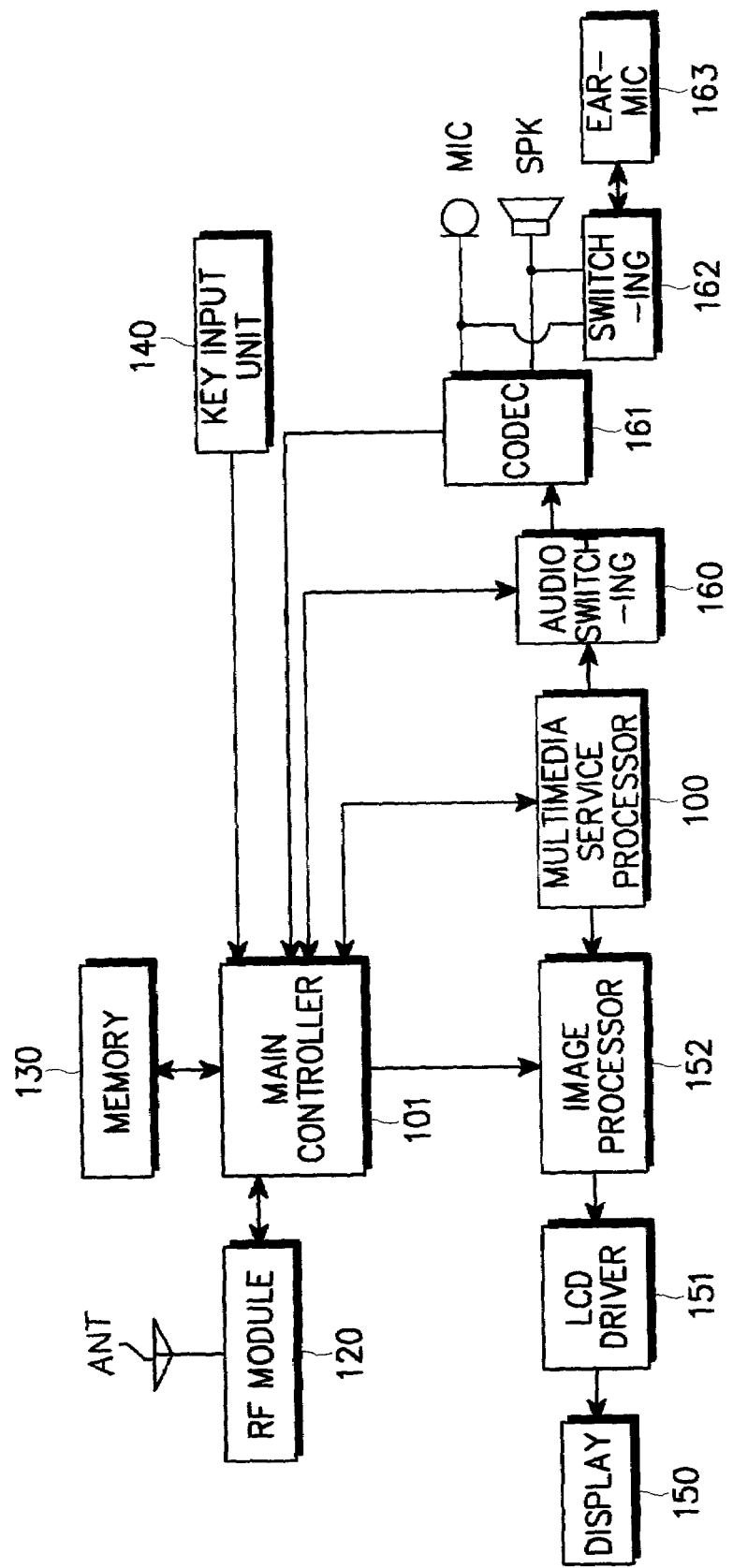
FIG. 1 is a schematic block diagram illustrating a mobile terminal according to an embodiment of the present invention.

Referring to FIG. 1, a main controller 101 of the mobile terminal according to an embodiment of the present invention controls the overall operation of the mobile terminal, including call processing functions and other functions (e.g., a phone number management function, a personal schedule management function, a voice dial function, and a bell mode select function). A memory 130 stores an operating program of the mobile terminal, phone number data and schedule data. An RF (Radio Frequency) module 120 performs up/down-conversion, filtering and amplification of RF signals received from and transmitted to an antenna ANT. A key input unit 140 includes a plurality of numeric keys and function keys, and may additionally include a mouse device and a touch screen for the multimedia service according to an embodiment of the present invention which could be external devices or may be implemented as part of the mobile terminal. A display 150, preferably a TFT LCD (Thin Film Transistor Liquid Crystal Display), displays character information, menu information, still images and moving images under the control of an LCD driver 151. The LCD driver 151 drives the display 150 and has a structure shown in FIG. 2.

A codec (Coder/Decoder) 161 codes a signal input from a microphone MIC, and decodes a received signal before outputting it to a speaker SPK. A switching section 162 switches the signals output from and input to the codec 161, to optionally form an audio path of the codec 161 to either an ear-microphone 163 or the microphone MIC and the speaker SPK included on the mobile terminal. An image processor 152 buffers the character information, menu information, still image information and moving image information provided from the main controller 101 and a multimedia service processor 100 and transmits the buffered information to the LCD driver 151 directly or after digital-to-analog (D/A) conversion.

The multimedia service processor 100, at the user's multimedia service request, accesses the corresponding server and sends a data request. The multimedia service processor 100 buffers received audio and image data and outputs the buffered data in real time. Upon receipt of image data, the multimedia service processor 100 outputs the received image data through the image processor 152; upon receipt of menu and character information, the multimedia service processor 100 outputs the received menu and character information to the main controller 101; and upon receipt of audio data, the multimedia service processor 100 outputs the received audio data through the codec 161. The detailed structure of the multimedia service processor 100 and the image processor 152 will be described below with reference to FIG. 2. An audio switching section 160 optionally provides the normal audio data output from the main controller 101 or the audio data (e.g., RealAudio® data) associated with the moving image output from the multimedia service processor 100 to the codec 161.

Figure 2:
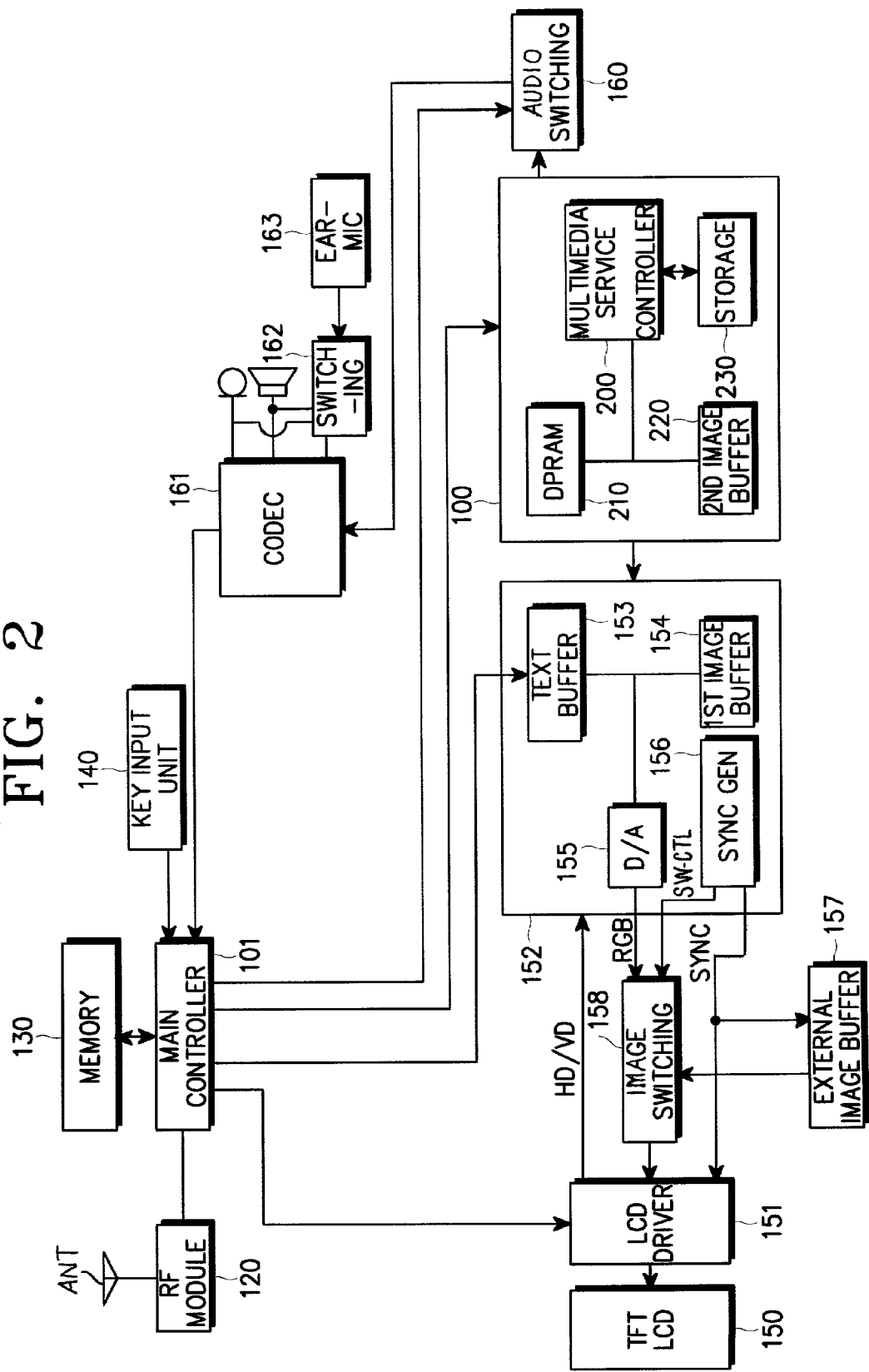
FIG. 2 is a detailed block diagram illustrating the mobile terminal according to an embodiment of the present invention.

Referring to FIG. 2, the image processor 152 includes a text buffer 153 for buffering data received from the main controller 101, a first image buffer 154 for buffering data received from the multimedia service processor 100, a sync generator 156 for providing horizontal and vertical sync signals to the LCD driver 151 and a switching control signal to image switching section 158, and a D/A converter 155 for converting the digital data output from the buffers 153 and 154 to an analog signal. Image switching section 158, interposed between the LCD driver 151 and the image processor 152, optionally provides the LCD driver 151 with the image signal output from the image processor 152 or an external image signal received from external image buffer 157.

Further, an audio switching section 160, interposed between the codec 161 and the multimedia service processor 100, optionally switches the audio data output from the main controller 101 or the audio data output from the multimedia service processor 100 to the codec 161. Although the present invention has been described with reference to an embodiment in which the audio switching section 160 is formed separately from the multimedia service processor 100, it should be noted that the audio switching section 160 may be built in the multimedia service processor 100 as an ASIC (Application Specific Integrated Circuit).

The multimedia service processor 100 includes a DPRAM (Dual Port Random Access Memory) 210 for buffering data received from the main controller 101, a second image buffer 220 for buffering the image data out of the data received from the main controller 101 and outputting the buffered image data to the image processor 152 (particularly to the first image buffer 154), a storage 230 comprised of a cache memory and a RAM, for storing a program for the multimedia service, information generated during the multimedia service and access information needed to make an access to the server, and a multimedia service controller 200 for controlling the buffers 210 and 220 and the storage 230 and performing the multimedia service operation.

Now, with reference to FIGS. 2 and 3, a detailed description will be made regarding a procedure for performing the multimedia service through the mobile terminal according to an embodiment of the present invention.

Figure 3:
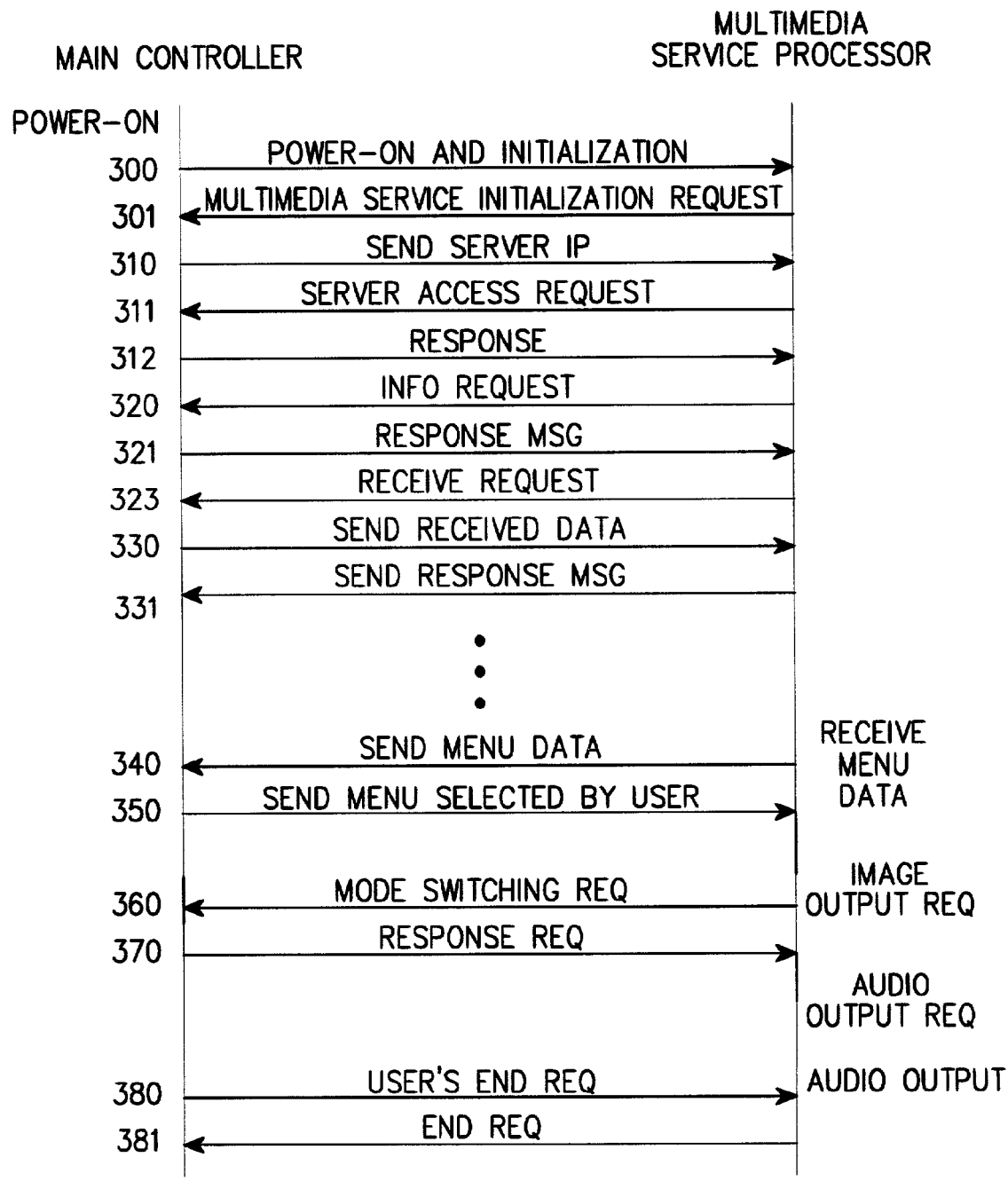
FIG. 3 is a flow diagram illustrating a procedure for outputting audio and video information in real time in a mobile terminal according to an embodiment of the present invention.

In step 300 of FIG. 3, upon receipt of a key input for the multimedia service from the key input unit 140 at the user's request, the main controller 101 turns on (or enables) the multimedia service processor 100, and then initializes the multimedia service operation. The multimedia service processor 100 then loads, in step 301, the multimedia service program stored in the storage 230 and sends a multimedia service initialization request to the main controller 101.

In step 310, the main controller 101 sends a server IP (Internet Protocol) requested by the user to the multimedia service processor 100. In step 311, the multimedia service processor 100 designates the corresponding IP and port and sends the designation information to the main controller 101, thereby sending a server access request. Upon receipt of the access request, the main controller 101 sends, in step 312, a response message to the multimedia service processor 100, sets up a call to the base station (not shown) and transmits the corresponding server access information through the RF module 120.

In step 320, the multimedia service processor 100 sends an information request to the main controller 101. Herein, the requested information may include the menu information, moving images, still images, and audio information such as RA and MP3 files. The main controller 101 then sends a corresponding information request message to the server accessed according to the received request message. Thereafter, the main controller 101 sends a response message to the multimedia service processor 100 in step 321. In step 323, the multimedia service processor 100 sends to the main controller 101 a receive request message for receiving the requested information from the main controller 101. The message includes the size information of the data to be received, and upon receipt of the size information of the corresponding data, the main controller 101 sends the received data to the DPRAM 210 in the multimedia service processor 100 in step 330. Upon receipt of the data, the multimedia service processor 100 sends a response message in step 331. The foregoing steps 320 to 331 may be repeated according to the type and size of the requested information.

Upon receipt of the data, the multimedia service processor 100 analyzes the received data to determine whether it is menu data, still image data, moving image data or audio data. When the received data is menu data, the multimedia service processor 100 sends the corresponding data back to the main controller 101 in step 340, to output the menu data through the image processor 152, the LCD driver 151 and the display 150, after the menu is selected by the user at step 350. When the received data is still image data or moving image data, the multimedia service processor 100 buffers the corresponding data through the second image buffer 220 and allows the first image buffer 154 in the image processor 152 to read out the data. The read image data is displayed on the display 150 after D/A-conversion under the control of the LCD controller 151. That is, the normal menu data is output through the main controller 101 and the image data is output through the multimedia service processor 100.

Further, when the received data is audio data, the multimedia service processor 100 outputs the corresponding data to the audio switching section 160 and switches the audio path of the audio switching section 160 such that the output data is applied to the codec 161. The audio data applied to the codec 161 is converted to an analog audio signal and output through the speaker SPK or the ear-microphone 163.

In order to output still image data or moving image data when the status of the output mode of the display 150 is in menu output mode or character information output mode, the multimedia service processor 100 sends a mode switching request to the main controller 101 and outputs the corresponding data to the image processor 152 in step 360. The main controller 101 then requests the image processor 152 to switch the output mode, and the image processor 152, at the request of the main controller 101, switches the buffer and outputs the data to the LCD driver 151 at step 370. Upon receipt of a multimedia service end request from the user at step 380, the main controller 101 turns off (or disables) the multimedia service processor 100 and releases the connection with the base station at step 381.

As described above, the mobile terminal according to the present invention includes an image processor and multimedia service processor to output audio and image data and performs different processes according to the type of the image data, thus making it possible to provide a real-time audio and video service (or multimedia service) at an improved processing speed, with the load of the mobile terminal reduced.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. An apparatus for providing a multimedia service in a mobile terminal, comprising:
   a main controller for controlling a call setup operation between the mobile terminal and a base station;
   a codec for coding an audio signal output from a microphone and decoding a received audio signal;
   a display for outputting image data;
   a display driver for driving the display;
   a multimedia service processor for accessing a corresponding server and sending a data request to the server upon receipt of a multimedia service request, outputting received image data to the image processor, outputting received menu and character information data to the main controller, and outputting received audio data to the codec; and
   an image processor for buffering information received from the main controller and the multimedia service processor, converting the buffered information according to an output mode of the display and providing the converted information to the display driver.

2. The apparatus as claimed in claim 1, wherein the image processor comprises:
   a first buffer for buffering data received from the main controller;
   a second buffer for buffering data received from the multimedia service processor;
   a sync generator for providing vertical and horizontal sync signals to the display driver; and
   a digital-to-analog (D/A) converter for converting digital data output from the first and second buffers to an analog signal.

3. The apparatus as claimed in claim 1, further comprising an image switching section interposed between the display driver and the image processor, for optionally providing the display driver with image data output from of the multimedia service processor or external image data.

4. The apparatus as claimed in claim 1, further comprising an audio switching section interposed between the multimedia service processor and the codec, for optionally providing audio data output from the main controller or audio data output from the multimedia service processor to the codec.

5. The apparatus as claimed in claim 1, wherein the multimedia service processor comprises:
   a data buffer for buffering data received from the main controller;
   an image buffer for buffering image data out of the data received from the main controller and outputting the buffered image data to the image processor;
   a storage for storing a multimedia service program, information generated during the multimedia service and information needed to access the server; and
   a multimedia service controller for controlling the data and image buffers and the storage, and performing a multimedia service operation.

6. A method for providing a multimedia service in a mobile terminal including a main controller for controlling a call setup operation between the mobile terminal and a base station; a codec for coding an audio signal output from a microphone and decoding a received audio signal; a display for outputting image data; a display driver for driving the display; an image processor for buffering information received from the main controller and a multimedia service processor, converting the buffered information according to an output mode of the display and providing the converted information to the display driver; and said multimedia service processor, at a multimedia service request, accessing a corresponding server and sending a data request to the server, outputting received image data through the image processor, outputting received menu and character information data to the main controller, and outputting received audio data through the codec, the method comprising the steps of:
   upon receipt of the multimedia service request, connecting, through the multimedia service processor, a call through the main controller and accessing the corresponding server;
   after completing the access, sending, through the multimedia service processor, a multimedia information request to the server and sending a receive request to the main controller according to the information request;
   upon receipt of the requested information, sending, through the main controller, the corresponding information to the multimedia service processor; and
   analyzing, in the multimedia service processor, the information to provide the information to the main controller if the information is character or menu information, to output the information through the image processor if the information is image data, and to output the information through the codec if the information is audio data.

7. The method as claimed in claim 6, wherein the step of outputting the information through the image processor comprises the step of:
   upon receipt of the image data, buffering the received image data for a predetermined time and providing the buffered image data to the image processor; and
   converting, in the image processor, the buffered image data to an analog image signal and outputting the converted analog image signal to the display through the display driver.

8. The method as claimed in claim 6, wherein the receive request according to the information request includes size information, and upon receipt of the size information, the main controller sends the corresponding information to the multimedia service processor.

9. The method as claimed in claim 6, wherein the step of outputting the information through the image processor comprises the steps of:
   upon receipt of an image output request, when an output mode of the display is in a menu output mode or a character information output mode, sending a mode switching request to the image processor; and sending the image data to the image processor according to the mode switching request and outputting the image data through the display.

10. The method as claimed in claim 6, further comprising the step of turning off, through the main controller, the multimedia service processor and releasing a connection with the base station, upon receipt of a multimedia service end request.

* * * * *